United States Patent [19]
Föhl

[11] Patent Number: 5,188,393
[45] Date of Patent: Feb. 23, 1993

[54] CONTROL MECHANISM FOR PRETENSIONERS IN A SAFETY BELT SYSTEM OR FOR A GAS BAG RESTRAINING SYSTEM

[75] Inventor: Artur Föhl, Schorndorf, Fed. Rep. of Germany

[73] Assignee: TRW Repa GmbH, Alfdorf, Fed. Rep. of Germany

[21] Appl. No.: 685,906

[22] Filed: Apr. 16, 1991

[30] Foreign Application Priority Data

Apr. 17, 1990 [EP] European Pat. Off. ............ 90107274

[51] Int. Cl.$^5$ .............................................. B60R 22/36
[52] U.S. Cl. .................................... 280/806; 280/734
[58] Field of Search ............... 280/806, 807, 734, 735; 297/480; 180/282; 242/107.4 A; 200/61.45 R, 61.53, 61.46

[56] References Cited

U.S. PATENT DOCUMENTS

4,538,774 9/1985 Kawaguchi et al. ............ 280/806 X
4,932,722 6/1990 Motozawa ............................ 297/480
5,039,127 8/1991 Föhl ...................................... 280/806

*Primary Examiner*—David H. Bollinger
*Attorney, Agent, or Firm*—Tarolli, Sundheim & Covell

[57] ABSTRACT

For triggering of a pretensioner or a gas-bag restraining system in vehicles a vehicle-sensitive inertia mass pivotally mounted in a housing is provided. A strike piece pivotally mounted in the housing and spring-loaded in the direction of a firing pin bears via a roller on a cam face of the inertia mass. The configuration of the cam face, the path of movement of the roller on a pivot movement of the spring-loaded strike piece and the direction of movement of the inertia mass are adapted to each other in such a manner that the triggering criteria of an electronic trigger circuit integrating the deceleration values above a predetermined threshold with respect to time are simulated.

14 Claims, 4 Drawing Sheets

CONTROL MECHANISM FOR PRETENSIONERS IN A SAFETY BELT SYSTEM OR FOR A GAS BAG RESTRAINING SYSTEM

The invention relates to a control mechanism for pretensioners in a safety belt restraining system or for a gas-bag restraining system in motor vehicles. These control mechanisms include a vehicle-sensitive inertia mass mounted pivotally or translationally displaceably in a housing and an actuating member for initiating the operation of the pretensioner or gas bag system.

For triggering or releasing the operation of a pretensioner in a safety belt restraining system or of a gas-bag restraining system in vehicles a release or trigger device is required. Particularly efficient are electronic control systems which include complicated circuits evaluating the vehicle deceleration. The deceleration values occurring in a vehicle collision may be very different, depending on the vehicle type. Each vehicle has its own "crash curve" which represents the profile of the deceleration values with time. To prevent unintentional triggering, only deceleration values which exceed a predetermined threshold value of for example 4 g are taken into account. Momentary deceleration peaks which can occur through jolts or the like must not lead to triggering. For this reason, the deceleration values measured are integrated with respect to time. The release takes place only at a predetermined value of the integral which may be different from vehicle to vehicle. By means of electronic circuits it is possible without any difficulty to effect the triggering exactly at a certain value of the integral. Also, no difficulty is involved in adapting the triggering criteria of a given electronic circuit to different circumstances or vehicle types.

However, for each electronically controlled pretensioner system or gas-bag restraining system a separate electrical drive line is required and this leads to considerable material and assembly expenditure.

Mechanical drive systems which can be associated individually as regards spatial arrangement and function with each pretensioner or gas-bag unit are favourable as regards costs. However, the conventional mechanical drive systems are very difficult to manage as regards their triggering criteria and can hardly be adapted in reliably reproduceable manner or with adequate long-time stability to the particular use conditions.

The primary object of the invention is to provide a control mechanism for a pretensioner of a safety belt restraining system or for a gas-bag restraining system in motor vehicles having control criteria which can be adapted to the particular conditions just as easily, accurately and with long-time reproduceability as with electronic triggering systems.

This is achieved according to the invention by a control mechanism wherein a release member pivotally mounted in a housing to be movable between a normal readiness position and a release position and spring-loaded in the direction of the release position is provided. A vehicle-sensitive inertia mass engages the release member. An actuating member is mounted pivotally in the housing and has a roller rotatably mounted thereon. The actuating member bears via the roller on a cam face of the release member. The configuration of the cam face is such that:

the actuating member is held in a stable readiness position as long as no deceleration forces exceeding a predetermined value occur at the inertia mass;

the roller rolls on the cam face of the release member oppositely to the spring action on the actuating member when deceleration forces exceeding the predetermined value occur at the inertia mass, and when the deceleration forces decrease the actuating member returns to its stable readiness position in that the roller rolls on the cam face in the opposite direction; and under the action of deceleration forces at the inertia mass having a magnitude exceeding the predetermined value and, integrated over time, corresponding to a predetermined velocity loss, the roller on the cam face overcomes a point beyond which an over-center effect occurs by which the release member suddenly releases the actuating member to initiate operation of the pretensioner or gas bag system.

If this embodiment of the control mechanism according to the invention is compared with an electronic release or triggering system, the predetermined value of the deceleration forces corresponds to the treshold beyond which integration starts in an electronic system. An electronic system calculates the trigger instant from the predetermined velocity loss and the deceleration occurring. The predetermined deceleration value and the predetermined velocity loss can be defined solely by the configuration of the cam face. At its one end the cam face preferably has an end limitation against which the roller of the actuating member bears in the readiness position. This end limit is preferably followed by a first portion of the curve surface or cam face on which the roller under the influence of deceleration forces occurring at the inertia mass must overcome a resistance corresponding to the predetermined value for the roller to be able to move further on the following portion of the cam face. This following portion of the cam face is distinguished in that the roller moves further only under the influence of deceleration forces exceeding the predetermined value but under deceleration forces dropping therebelow, rolls back in the direction of its readiness position. The steepness of this portion of the cam face is small and so dimensioned that the roller rolls further against almost constant or gradually increasing resistance and under decreasing deceleration forces rolls back on the cam face. It is only when the end of this portion of the cam face is reached that an over-center effect arises which is achieved in practical embodiments in that the cam face terminates with an abrupt rearward jump.

An almost constant resistance against which the roller further moves on the cam face is achieved in embodiments with a cam face corresponding to an archimedian spiral of small pitch.

The more easily movable and accurate the roller, actuating member and release member are mounted, the more accurately the release criteria of the control mechanism according to the invention can be adjusted. Provision is therefore made in preferred embodiments for mounting these elements on roller bearings. Furthermore, the housing of the control mechanism is preferably hermetically encapsulated to exclude influences on the easy moving of the mounting for a long period of ten years and more.

Further features and advantages of the invention will be apparent from the following description of several embodiments and from the drawings, to which reference is made and in which.

Figure 1:
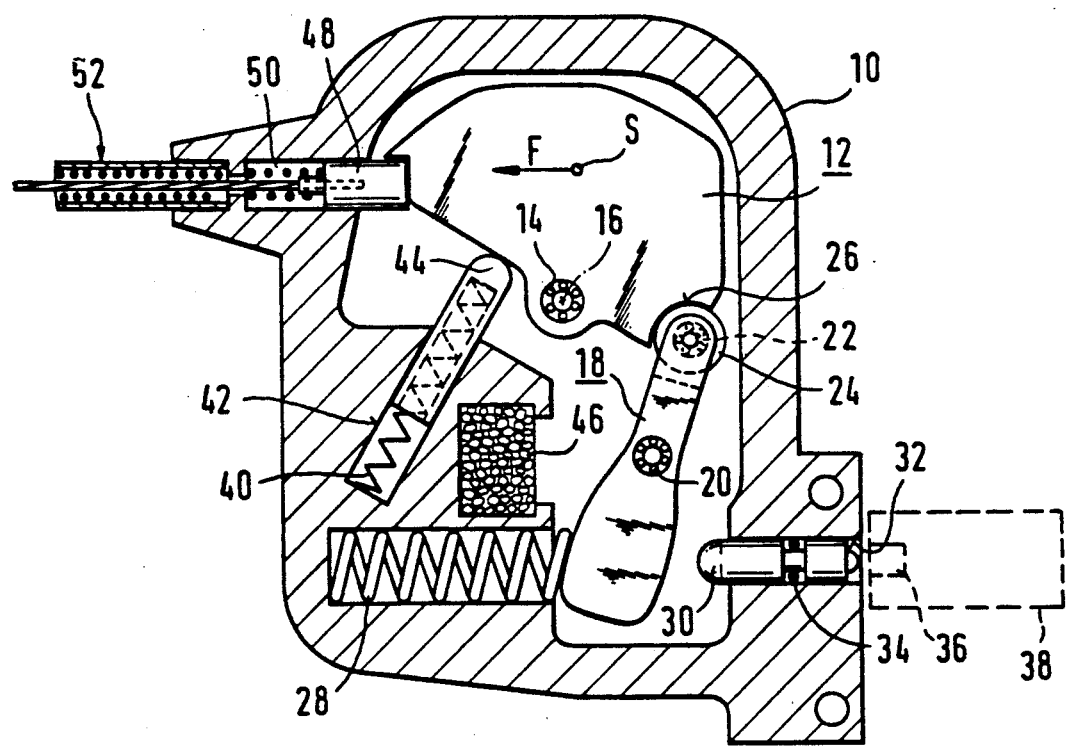
FIG. 1 is a schematic section of a first embodiment of the control mechanism in the readiness state.
Figure 2:
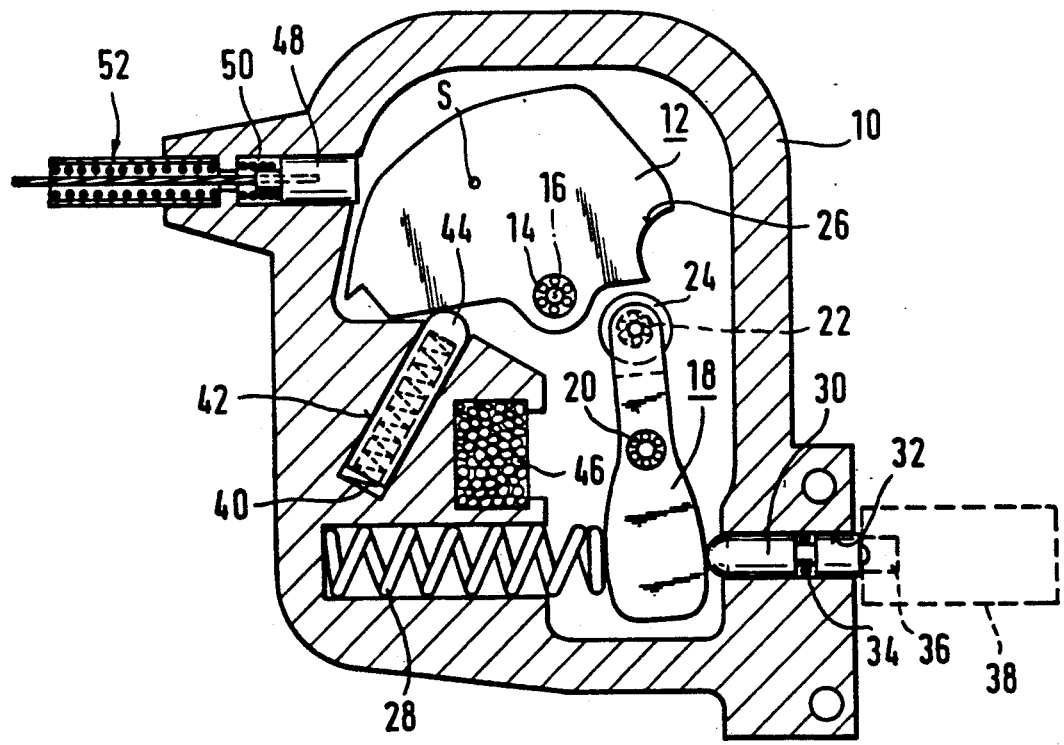
FIG. 2 is a sectional view of the same control mechanism in the triggered state.

In the embodiment of the control mechanism shown in FIGS. 1 and 2, in an outwardly hermetically sealed housing 10 a vehicle-sensitive inertia mass 12 is mounted for easy pivotal movement about an axis 16 on a rolling bearing 14. The center of gravity S of the inertia mass 12 lies in the installed condition of the housing 10 at least approximately vertically above the axis 16 in order to largely eliminate influences due to shocks acting in the vertical direction. Furthermore, in the housing 10 a strike piece 18 in the form of a two-armed lever is pivotally mounted by means of a rolling bearing 20. The strike piece 18 is provided at the free end of its lever arm facing the inertia mass 12 with a roller 24 mounted for easy rotatable movement on a rolling bearer 22. Said roller 24 bears at its periphery on a curve surface or cam face 26 of the inertia mass 12. The other lever arm of the strike piece 18 is urged by a pressure spring 28 in the direction towards a firing pin 30 which is displaceably mounted in a bore 32 of the housing 10, the sealing of the housing 10 being ensured by an O-ring 34. The firing pin 30 projects into the interior of the housing 10. In the embodiment illustrated here it cooperates with the impact igniter 36 of a pyrotechnical gas generator 38 which in turn is provided for activation of a tightening means (not shown). In the embodiment shown the inertia mass 12 is subjected to the action of a return spring 40 which is accommodated in a bore 42 of the housing 10 and presses on a push member 44 which bears with a rounded head piece on the face of the inertia mass 12 opposite thereto. A moisture-absorbing hygroscopic substance 46 is arranged in a recess in the interior of the housing 10. In the state shown in FIG. 1 the inertia mass 12 is in a stable readiness position in which it is held by a slide 48 which is guided in a bore 50 of the housing 10 and actuated via a sheathed cable 52. The arresting of the inertia mass 12 in its readiness position under the action of the slide 50 is effective only in specific operating states. For example, the drive mechanism shown in FIG. 1 can be arranged directly on a vehicle seat for controlling a pretensioner integrated into the seat. On seat adjustment, the possibility of jolts of considerable intensity cannot be excluded. If the slide 50 is coupled via the sheathed cable 52 to the seat adjusting lever, the inertia mass 12 can be secured in its readiness position to permit seat adjustment without any danger of unintentional triggering of the pretensioner. Measures for hermetic sealing towards the outside are also taken in the region of the introduction of the sheathed cable 52 into the housing 10.

When the slide 48, as shown in FIG. 2, releases the inertia mass 12 the latter nevertheless remains in its stable readiness position because the cam face 26 on which the roller 24 bears has such an inclination with respect to the force of the spring 28 deflected and translated by the strike piece 18 that the inertia mass 12 tends to pivot clockwise (in FIG. 1). This tendency can be further assisted by the spring 40. However, pivoting of the inertia mass 12 clockwise is not possible because the cam face 26 has a steep end limitation, the face of which is directed transversely of the longitudinal axis of the strike piece 18.

Now, when under the action of a vehicle deceleration inertial forces act on the center of gravity S of the inertia mass as indicated in FIG. 1 by an arrow F, and if these inertial forces exceed a predetermined value, the inertia mass 12 begins to pivot against the action of the spring 40 and the spring 28 anticlockwise, the roller 24 rolling on the cam face 26 against almost constant resistance. If the deceleration forces last until a predetermined velocity loss has occurred, then the roller 24 moves on the cam face 26 up to an end point of said cam face at which the latter forms an abrupt jump back in the direction of the axis 16. An overcenter effect then occurs in that the roller 24 is suddenly released and the strike piece 18 is accelerated by the spring 28 without any obstruction. The fairly strongly dimensioned spring 28 accelerates the strike piece 18 along a pivot path of a few angular degrees to such an extent that said piece strikes with high kinetic energy against the firing pin 30 and drives the latter into the impact igniter 36 of the pyrotechnical gas generator 38.

If, however, during this operation the deceleration forces drop below the predetermined value, the roller 24 will then roll back along the curve face 26 in the direction of the stable readiness position.

In the embodiment of the control mechanism described, a specific threshold value, which must be overcome before the rolling movement of the roller 24 on the cam face 26 starts, is defined by the presence of the spring 40 and the steepness of the cam face. However, such a spring can be dispensed with if the cam face 26 is configured in suitable manner. Various embodiments in which such a spring may be omitted will be explained below with reference to FIGS. 8 to 10.

In the embodiment according to FIGS. 1 and 2 the inertia mass 12 forms at the same time a release or trigger element, thereby obtaining a compact construction of the entire control mechanism. However, with this embodiment the alignment of the housing 10 in space is defined within narrow limits.

Figure 3:
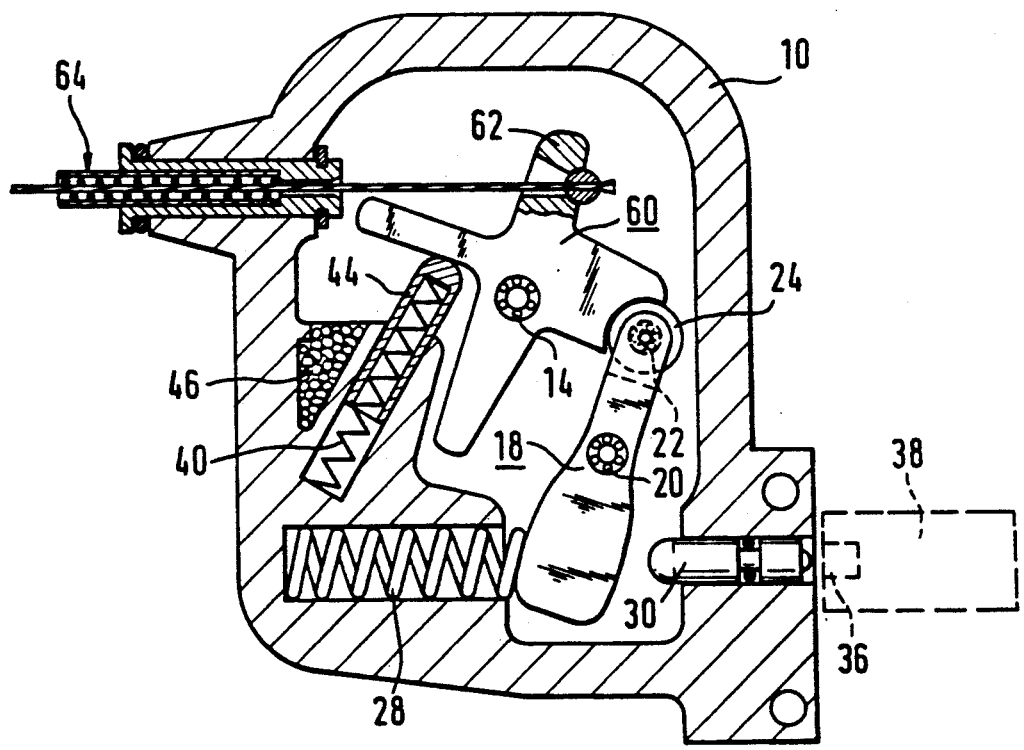
FIG. 3 is a section of a second embodiment of the control mechanism in the readiness state.
Figure 4:
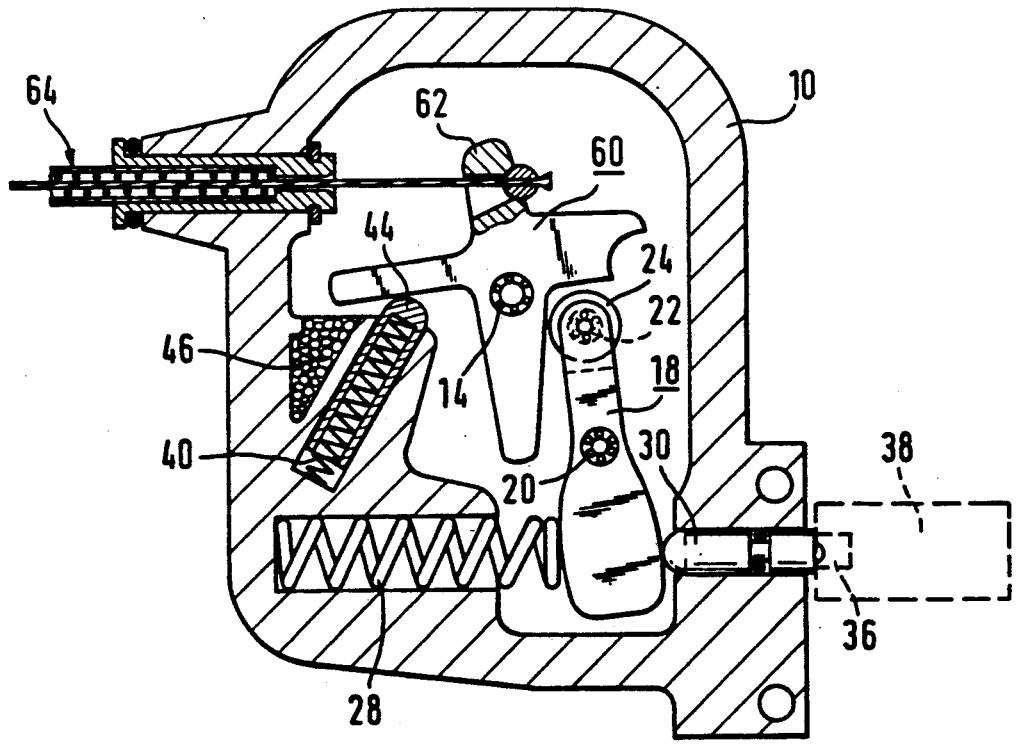
FIG. 4 is a section of the embodiment shown in FIG. 3 in the triggered state.

This limitation is not present in the embodiment according to FIGS. 3 and 4. In this embodiment the inertia mass is arranged separately from the trigger or release element 60 which is formed as low-mass multiarm lever. The inertia mass (not shown) which is guided in any suitable manner for easy translational displacement and pivoting engages the one arm 62 of said release element 60 via a sheathed cable 64. Otherwise, the arrangement and mode of operation in this embodiment are analogous to the embodiment of FIGS. 1 and 2. The housing 10 can now be installed in almost any desired alignment.

In both embodiments, by the hermetic sealing of the housing 10 in conjunction with the moisture-absorbing action of the hygroscopic substance 46, a high long-time constancy of the setting of the triggering criteria is achieved. The easy moving and precise mounting of all the critical functional parts thus cannot be impaired by any kind of soiling, corrosion or the like.

Figure 5:
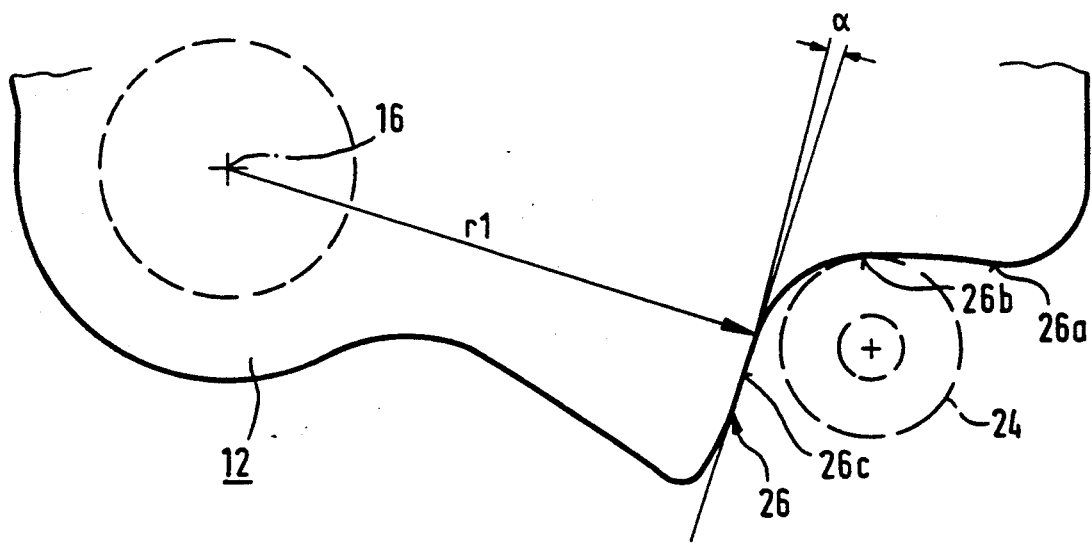
FIG. 5 is an enlarged schematic illustration of a control curve or cam on the trigger element of the control mechanism.
Figure 6:
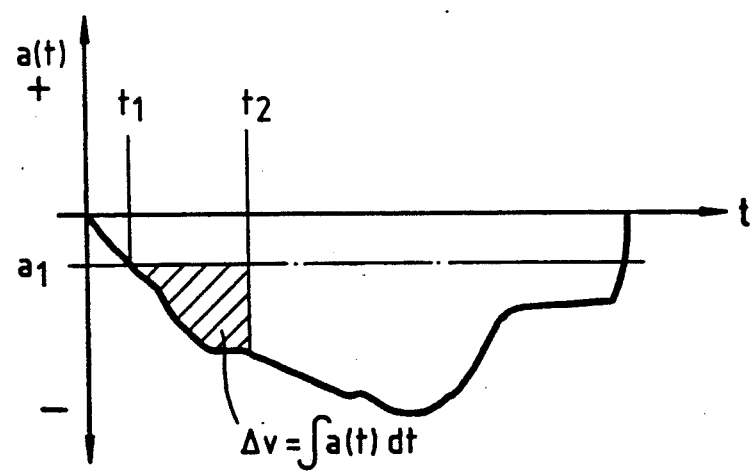
FIG. 6 is a diagram showing a typical crash curve.

With reference to FIGS. 5 and 6 details will now be explained regarding the configuration of the cam face 26 with regard to the setting of the desired triggering behaviour.

FIG. 5 shows to an enlarged scale the part of the inertia mass 12 on which the cam face 26 is formed. Said cam face 26 comprises at one end an end limit 26a for the roller 24. This end limit 26a is followed by a concave portion 26b of the cam face. Substantially from a point onwards which is defined by a radius r1 with respect to the pivot axis 16 of the inertia mass 12, the cam face merges into a portion 26c which is defined by an archimedian spiral. In every point of the cam face along this portion 26c said face forms with a tangent to the circle of corresponding radius an angle $\alpha$ of substantially the same magnitude. It should be remembered that at any point of an archimedian spiral the radius vector and polar angle are proportional to each other. A uniform rotation of the inertia mass 12 about its axis 16 therefore produces on the portion 26c of the cam face a uniform movement of the roller 24 in the radial direction. The roller 24 therefore runs on the cam face 26 against a gradually but weakly increasing resistance when the inertia mass 12 rotates anticlockwise under the action of increasing deceleration. The inclination, present at each point of the cam face 26, to a tangent to the circle with corresponding radius has however the effect that the roller 24 tends to roll back to its stable initial position as soon as the inertial forces acting at the center of gravity of the inertia mass decrease.

It is only when the roller 24 has reached the end of the portion 26c of the cam face that an over-center effect occurs because the cam face moves away from the roller and enables the pivot movement thereof accelerated by the spring 28.

FIG. 6 shows in simplified form a typical "crash curve", i.e. the time variation of the deceleration values occurring in a vehicle crash. Up to an instant t1 the deceleration remains in magnitude beneath a value a1. It is only from this deceleration value a1 onwards that the inertia mass 12 should start its pivot movement under the action of the corresponding inertial forces. This deceleration value a1 is set by the steepness of the cam face 26 and possibly additionally by the spring 40 (FIGS. 1, 2). The pivot movement of the inertia mass 12 anticlockwise lasts as long as the deceleration value a1 is exceeded in magnitude. If the deceleration drops below the value a1 the pivot movement of the inertia mass 12 takes place in the opposite direction. However, if the magnitude of the deceleration remains above the value a1 up to an instant t2, a predetermined velocity loss $\Delta v$ has then occurred and the inertia mass 12 is pivoted until it moves beyond its over-center position. This velocity loss $\Delta v$ is the value of the integral with respect to time of the deceleration exceeding the predetermined value a1. It is typically between 0.5 and 1.0 m/sec, depending on the vehicle type.

During the rolling movement of the roller 24 on the portion 26c of the cam face only a very small pivot movement of the strike piece 18 occurs. The roller 24 is therefore pressed with approximately constant force by the spring 28 against the cam face. Due to the inclination of the cam face this almost constant application pressure is converted to a likewise almost constant return force which tends to pivot the inertia mass 12 back to its rest position. However, as soon as and for as long as the inertial forces engaging the center of gravity S of the inertia mass 12 overcome this return force the inertia mass will be pivoted anticlockwise.

Figure 7:
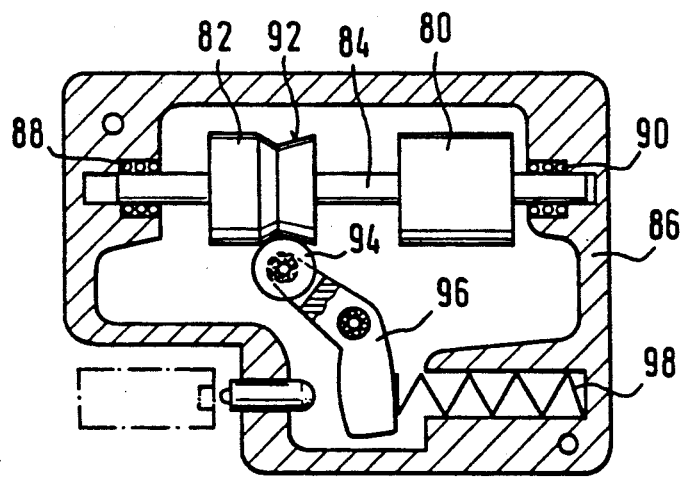
FIG. 7 is a sectional view of a third embodiment in the readiness state.

In the embodiment shown in FIG. 7 a cylindrical mass body 80 and a release element 82 are secured to a rod 84 which is guided for easy movement and precise translational displaceability in the housing 86 of the drive mechanism by means of two coaxial bores and rolling bearing elements 88, 90 arranged therein. At the outer periphery of the release element 82 a cam face 92 is formed on which a roller 94 bears which is rotatably mounted at the free end of the strike piece 96. The strike piece 96 is loaded by a pressure spring 98 in such a manner that the roller 94 is pressed against the cam face 92. The cam face 92 forms a truncated cone. It thus has a constant inclination to the roller 94. The triggering behaviour in this embodiment of the drive mechanism is therefore comparable with that in the embodiments described above.

Figure 8:
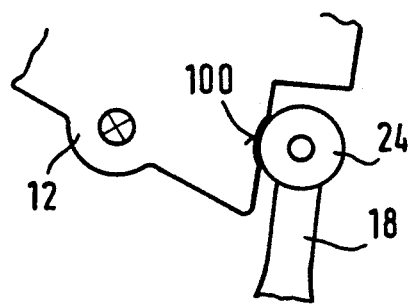
FIGS. 8 to 10 show further constructional variants.
Figure 9:
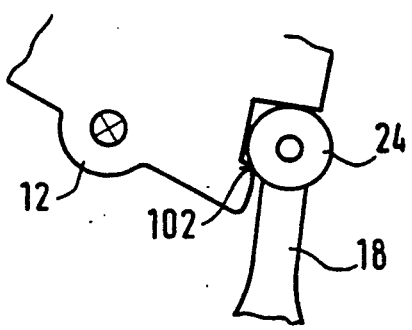
Figure 10:
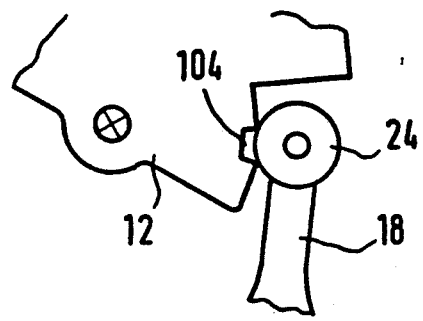

FIGS. 8 to 10 show schematically different constructional variants in which the predetermined deceleration value, beyond which the pivot movement of the inertia mass starts, is governed by the configuration of the cam face.

According to FIG. 8, the cam face has a trough 100, the form of which is adapted approximately to the outer periphery of the roller 24. According to FIG. 9, in the cam face an edge 102 aligned transversely of the running direction of the roller 24 is formed. According to FIG. 10, in the cam face a depression 104 defined by two edges is formed. Common to all these configurations is that a pivot movement of the inertia mass 12 cannot take place until a retarding threshold has been exceeded.

In the embodiments described above it is assumed that the control cam is formed on the inertia mass or the trigger element and the roller is mounted on the strike piece. Fundamentally, the control cam can also be formed on the strike piece and the roller mounted on the trigger element. Furthermore, via the firing pin 30 any desired systems can be initiated, for example also purely mechanically operating pretensioners which are equipped with an energy storage spring. Of course, operation of a pretensioner or gas bag system can be directly initiated by the actuating member where it is not required or desired to encapsulate the functional components of the control mechanism.

I claim:

1. A control mechanism for a pretensioner in a safety belt restraining system or in a gas-bag restraining system for motor vehicles, comprising:

a housing;

an actuating member for actuating the pretensioner, said actuating member being mounted in said housing for movement between a non-actuating position and an actuating position to actuate the pretensioner;

a vehicle-sensitive inertia mass movable under the influence of vehicle deceleration forces exceeding a predetermined value; and a release member coupled to said inertia mass for movement with said inertia mass, said release member being mounted in said housing for pivotal movement about an axis between a ready position blocking movement of said actuating member into the actuating position and a release position enabling movement of said actuating member into the actuating position;

first spring means for biasing said actuating member toward the actuating position and for biasing said release member toward the release position;

said release member having a concave cam surface;

said actuating member having a roller rollable on said concave cam surface of said release member during movement of said actuating member between the non-actuating position and the actuating position;

said cam surface on said release member having a first end portion, a second end portion, and a concave portion between said first and second end portions, said concave portion of said cam surface being defined by a radial distance from the axis of said release member which radial distance increases towards each of said first and second end portions, said cam surface also having a step portion adjoining said second end portion at which the radial distance from the axis of said release member suddenly decreases;

said concave portion of said cam surface acting on said roller to hold said actuating member in the non-actuating position when deceleration forces at the inertia mass are less than a predetermined value;

under the action of deceleration forces at the inertia mass having a magnitude exceeding the predetermined value and, integrated over time, corresponding to a velocity loss less than a predetermined velocity loss, said release member being movable with said inertia mass against the bias of said spring means out of the ready position toward the release position and said roller rolling on said cam surface in a first direction and then rolling on said cam surface in a second direction opposite to said first direction to return to the ready position when the deceleration forces decrease; and under the action of deceleration forces at the inertia mass having a magnitude exceeding the predetermined value and, integrated over time, corresponding to a predetermined velocity loss, said release member being movable with said inertia mass against the bias of said spring out of the ready position toward the release position and said roller rolling on said cam surface in a first direction toward said second end portion and beyond said step portion, and said release member suddenly moving to the release position to release said actuating member for movement to the actuating position to actuate said pretensioner.

2. The control mechanism according to claim 1, wherein said inertia mass is integral with said release member.

3. The control mechanism according to claim 1, wherein said roller is rotatably mounted on said actuating member via a roller bearing.

4. The control mechanism according to claim 1, wherein said release member is pivotally mounted via a roller bearing in the housing.

5. The control mechanism according to claim 1, wherein said housing is substantially hermetically sealed.

6. The control mechanism according to claim 5, further including a moisture-absorbing hygroscopic substance arranged within said housing.

7. The control mechanism according to claim 1, wherein said first spring means acts between said housing and said actuating member and urges said roller against said cam surface, and further comprising second spring means acting between said housing and said release member for biasing said release member away from the release position.

8. The control mechanism according to claim 1, wherein said second end portion of said cam surface is flat or slightly convex, said actuating member having a longitudinal axis and being oriented in said housing such that a plane perpendicular to said axis is inclined to said second end portion of said cam surface at every point thereon.

9. The control mechanism according to claim 8, wherein the angle of inclination between said plane and said flat or slightly convex surface portion is substantially constant over the extent of said flat or slightly convex surface portion.

10. The control mechanism according to claim 8, wherein said first end portion of said cam surface comprises a stop surface which limits movement of said roller on said cam surface.

11. The control mechanism according to claim 1, wherein said concave portion of said cam surface is formed by a depression in said release member the depth of which defines a deceleration threshold corresponding to the predetermined deceleration value.

12. The control mechanism according to claim 11, wherein said depression is at least partially defined by an edge adjoining said second end portion of said cam surface.

13. The control mechanism according to claim 1, wherein said inertia mass is connected via a deflection element in force-transmitting manner to said release member which is formed as a low-mass lever member and mounted at least approximately in its center of gravity.

14. The control mechanism according to claim 1, wherein said inertia mass is connected via a sheathed cable to said release member.

* * * * *